United States Patent [19]

Dassele et al.

[11] 4,222,629
[45] Sep. 16, 1980

[54] FIBER OPTIC CONNECTOR ASSEMBLY

[75] Inventors: Michael A. Dassele, Scottsdale; Stephen T. Kush; Don E. Mitchell, both of Phoenix, all of Ariz.

[73] Assignee: Sperry Corporation, New York, N.Y.

[21] Appl. No.: 890,168

[22] Filed: Mar. 27, 1978

[51] Int. Cl.³ ............................................. G02B 5/14
[52] U.S. Cl. ................................. 350/96.20; 250/227; 250/552
[58] Field of Search ............... 350/96.20, 96.25, 96.27; 250/227, 552

[56] References Cited

U.S. PATENT DOCUMENTS

| 3,043,179 | 7/1962 | Dunn | 350/96.27 X |
| 3,624,462 | 11/1971 | Phy | 350/96.27 |
| 3,859,536 | 1/1975 | Thiel | 350/96.20 X |

FOREIGN PATENT DOCUMENTS 2727177 12/1977 Fed. Rep. of Germany ........ 350/96.20

Primary Examiner—Stewart J. Levy
Attorney, Agent, or Firm—Howard P. Terry; Seymour Levine

[57] ABSTRACT

A connector assembly for efficiently coupling optical data from a fiber optic transmission line terminal to an electro-optic conversion device which may be associated with, for example, a hybrid electronics circuit substrate contained within a hermetically sealed enclosure or hybrid circuit package is disclosed. The connector is characterized by a unitary assembly of a generally tubular connector body adapted to removably receive and align a fiber optic terminal with an aperture therein, a transparent faceplate aligned with the aperture and hermetically sealed in the body, and an electro-optic conversion device mounted on the body in alignment with the aperture. The connector assembly may be tested prior to being hermetically sealed to the hybrid circuit package whereafter the conversion device may be connected to the hybrid circuit substrate and the entire hybrid circuit package hermetically sealed.

6 Claims, 2 Drawing Figures

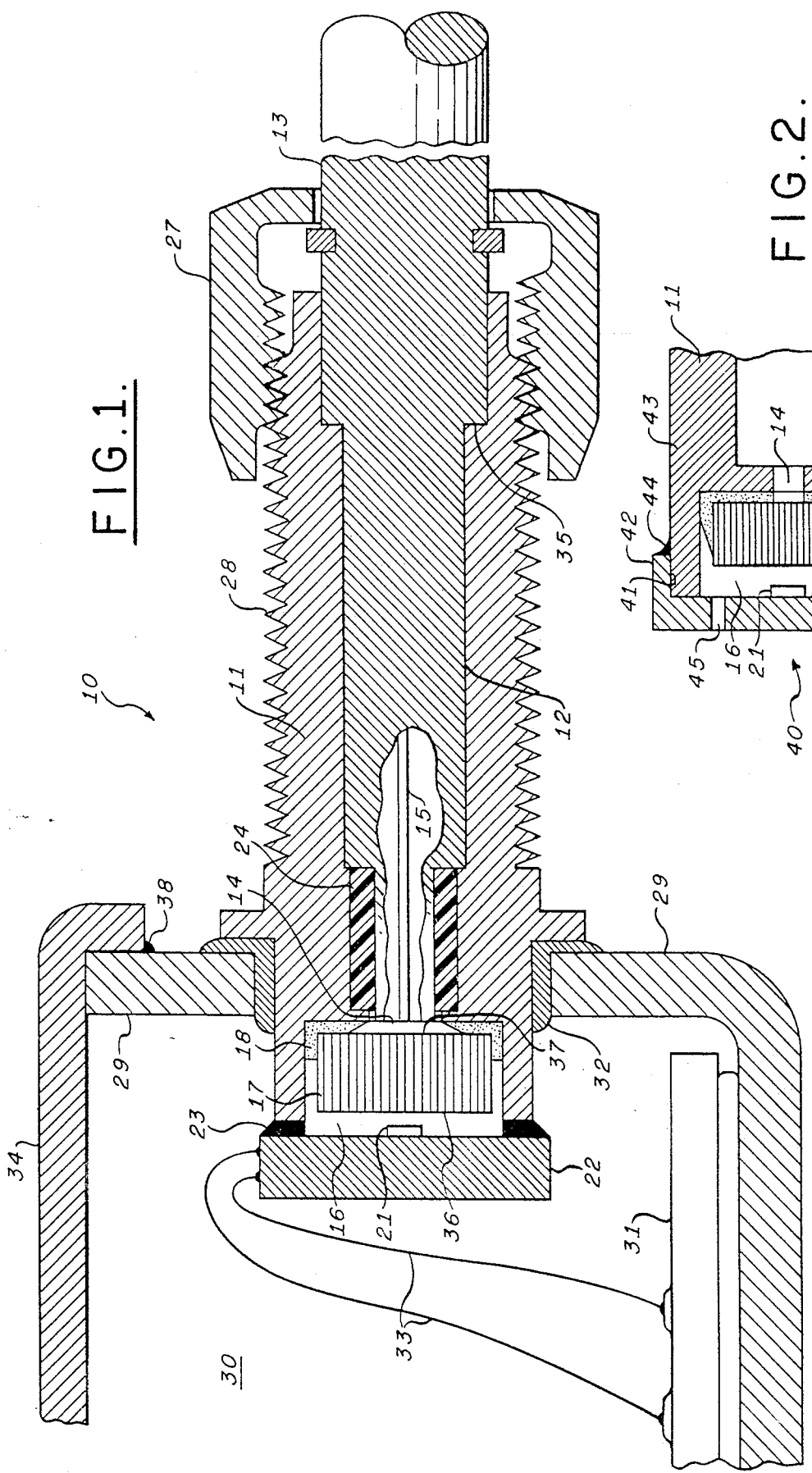

FIBER OPTIC CONNECTOR ASSEMBLY

BACKGROUND OF THE INVENTION

1. Field of the Invention

The invention pertains to apparatus for coupling optical components and more particularly to the coupling of a single optical fiber to electro-optic conversion means.

2. Description of the Prior Art

Coupling of energy in the visible or near visible light spectrum, herein referred to as optical energy, from a fiber optic transmission line terminal to an electro-optic conversion device normally contained within a hermetically sealed container, such as a hybrid electronics package, in a convenient yet efficient manner presents a number of unique problems that have not been solved economically by prior art coupling mechanisms. Included in these problems is the beam divergence associated with a large separation between the fiber end and the conversion device. These problems are aggravated when a single fiber transmission line is employed. One prior art structure includes a light energy transparent window hermetically sealed in the hybrid package wall with an optical line terminal receiving plug on the outside of the package and a stub line on the inside aligned with a conversion device, usually supported on the hybrid circuit substrate, through an alignment device such as a "V" block. While such an arrangement provides good hermeticity, it presents problems, such as coaxial alignment of the optical lines and beam divergence between the ends thereof, which limit optical coupling efficiency. Alternatively, the fiber optic line itself was passed through an opening in the package sidewall and sealed thereto. While this eliminated the alignment and divergence problems, it presented hermeticity problems. Another technique involved the use of micropositioners to precisely align the fiber terminal with the electro-optic conversion device mounted on the hybrid substrate through an opening in the hybrid package to obtain maximum coupling efficiency and then sealing the terminal in the opening. While this procedure maximizes efficiency, cost is increased and hermeticity reliability is reduced. In these prior art devices the electro-optic devices are usually mounted on or carried by the circuit substrate independent of the fiber coupling means or support making it difficult and expensive to provide coupling efficiency and hermeticity. Other prior art coupling techniques involve the use of collimating lenses but costs and alignment constraints render such techniques impractical. The present invention overcomes the foregoing disadvantages of the prior art and achieves a highly efficient optical coupling without jeopardizing the hermeticity of the hybrid circuit package. The invention further achives these advantages without complex and expensive fixtures and with standard hybrid circuit package manufacturing techniques.

SUMMARY OF THE INVENTION

A preferred fiber optic converter assembly constructed according to the principles of the present invention, which may be used with a hermetically sealed hybrid package, includes a connector body containing a precision machined bore which determines all critical radial and longitudinal alignment dimensions for inserting a standard single strand fiber optic connector plug or termination therein. These bore dimensions assure an optical alignment between the plug's optical fiber and a port or aperture which terminates the bore. Optical signals may propagate through the alignment aperture to a fiber optic faceplate which is secured with a conventional glass-to-metal seal in a well positioned at the opposite end of the connector body, i.e., on the side of the alignment aperture opposite the bore. A pellet having a diode chip, which may be an optical source or detector, is visually positioned to place the diode in a coaxial relationship with the optical alignment aperture and then is bonded to the well wall of the connector body to form an integral fiber optic connector assembly. The connector assembly body may then be hermetically sealed into a suitable opening in the hybrid package sidewall by means of a conventional metal-to-metal seal after which the diode may be connected to the hybrid circuit substrate by suitable conductors. The fiber optic faceplate and the alignment of the alignment aperture, diode chip, and the optical fiber, contained in the standard connector assembly, tend to minimize light coupling losses between the single optical fiber and the diode chip, thus providing for maximum or highly efficient signal transfer between the hybid microcircuit and the single optical fiber.

BRIEF DESCRIPTION OF THE DRAWINGS

FIG. 1 is a cross-sectional view of a fiber optical connector assembly constructed to adapt a standard fiber optic connector plug or termination to a hybrid circuit package.

FIG. 2 is a cross-sectional view of a section of a fiber optic connector assembly illustrating an alternate method for establishing a coaxial relationship between an electro-optic conversion device and the alignment aperture terminating the precision bore.

DESCRIPTION OF THE PREFERRED EMBODIMENT

FIG. 1 shows an embodiment of a fiber optic connector assembly 10 which includes a connector adapter body 11 which may be made from a compatible glass-to-metal seal alloy such as a nickel alloy known in the art as Carpenter 49 or 42–6. An axial bore 12 is precision machined therein to define all critical radial and longitudinal alignment surfaces which are determined from the dimensions of the fiber optic connector plug or termination 13 which is to be inserted in the axial bore 12. The axial bore of the adapter is provided at one end with an alignment aperture or port 14 which is substantially in a coaxial relationship with the terminal end of optic fiber 15, contained in the connector plug 13 when the plug 13 is inserted in the bore 12. The opposite end of the body 11 contains a well 16 into which a glass faceplate 17, to be described below, may be hermetically sealed, as by conventional glass frit bonding 18. An electro-optic conversion element 21 such as a LED or photo diode is aligned to be substantially in a coaxial relationship with the alignment port 14 by positioning a pellet 22, on which the diode chip 21 is mounted, while viewing through a microscope having a concentric ring reticle, or an alignment indicator similar thereto. The pellet 22 may be fabricated from a suitable ceramic, aluminum oxide, porcelainized steel or other suitable material. Upon the completion of this alignment the pellet 22 is bonded, as by epoxy 23, to the end of the connector adapter body 11, that is, to the sidewall of the well 16. This bond need not be hermetic, in fact, in some applications it may be desirable to vent the diode to the interior of a hermetically sealed package into which it may be inserted. After the diode pellet 22 is secured, the connector assembly 10 may be inserted into an opening in a wall 29 of a hybrid assembly 30 containing a hybrid microcircuit substrate 31 and sealed with a metal-to-metal seal 32, as for example with solder. The diode chip 21 may then be electrically coupled to the microcircuit substrate 31 through flying wire or ribbon bond 33. When this assembly is completed, the hybrid assembly may be sealed by positioning a cap 34 and sealing, as for example with solder 38, to the wall 29, thus providing a hermetically sealed hybrid package unit.

A compliance element 24, which may be a bushing made from a synethetic resin polymer sold under the trademark TEFLON, may be inserted in the axial bore 12 adjacent to the alignment aperture 14. The compliance element 24 securely grips the connector plug 13 to rigidly maintain the single optic fiber 15 contained therein in substantially a coaxial relationship with the alignment aperture 14 when the nut 27, which is an integral part of the connector plug 13, is tightened along the threads 28 on the outer surface of the connector adapter body 11. Without a compliance bushing, the alignment of the optical fiber 15 and the alignment port 14 must rely on a metal-to-metal interface, which may result in metal shavings accumulating in the adapter bore and subsequently causing a misalignment between the alignment port 14 and the optical fiber 15. To prevent damage to the optical fiber 15 or the faceplate 17 during the securing process, a small but finite gap is maintained between the optical fiber 15 and the faceplate surface 37. For the plug configuration shown in FIG. 1, this gap may be determined by a shoulder 35 that is precision located along the axial bore 12 to provide a reference surface wherefrom the length of the bore to the optical alignment aperture is determined.

Faceplate 17, when bonded to connector adapter body 11 to form a hermetic seal, serves a dual function: providing a hermetic seal between the interior of the hybrid package 30 and the fiber optic connector plug 13; and transmitting a light beam incident to either surface thereof without additional divergence, thus providing efficient optical coupling between the diode 21 and the single fiber optic transmission line 15. Faceplate 17 preferably includes a mosaic of optical fibers, each of which may be one to fifteen microns in core diameter, fused together to form a solid transparent device having optical glass characteristics.

A light beam within the acceptance angle of the faceplate will be transferred from one surface of the faceplate to the opposing surface thereof with essentially no transverse displacement. Each ray within the beam will exit at an angle equal to its entrance angle, thus the beam is transmitted from one surface to the other surface with no additional beam divergence.

One of the features of the connector assembly of the present invention is that the assembly may be fully tested prior to bonding it to the hybrid package or any other sealed unit. After the faceplate 17 is hermetically sealed into well 16 and the diode 24 is aligned with the aperture 14, the assembly is tested to assure, for example, the hermeticity of the frit seal 18 and the proper functioning of the diode. After these tests are completed, the connector assembly 10 may be soldered to the package side wall 29 and the electro-optic conversion device 21 may be coupled to the substrate 31 via coupling elements 33. The electrically completed unit may then be fully tested to assure proper operation. Finally, the cap 34 may be soldered to the wall 29 in an inert atmosphere, such as dry nitrogen gas, so that thereafter the inert atmosphere is contained within the interior 30 of the completed package by virtue of the hermetic seals 18, 32 and 38.

An alternate method of aligning the electro-optic converter 21 to the alignment aperture 14 is shown in FIG. 2. The electro-optic converter 21, which may be a diode chip, is precision aligned at the center of a base 39 of a well precision machined in a pellet 40. The pellet 40 is precision machined so that the inner surface 41 of the well wall 42 is substantially coaxial with the center of the well base 39. The outer surface 43 of the connector adapter body 11, in the vicinity of the well 16, is also precision machined to be substantially coaxial with the alignment aperture 14, and to be of a diameter to mate with the inner surface 41 of the pellet 40 to establish a coaxial alignment of the diode 21, with the aperture 14 and thus with the optical fiber 15. After the pellet 40 has been placed on the adapter connector body 11, it may be bonded thereto, as by epoxy 44. The well space closed by the pellet 40 may be vented as by vent 45 to the interior 30 of the package and thereby exposed to the inert atmosphere of the completed package.

While the fused fiber optic faceplate 17 has been found to be very successful, there may be applications wherein an optical glass plate may be used. In this case, the thickness of the glass should be as thin as the differential pressure between the interior and exterior of the completed package will permit to thereby minimize beam divergence between the end of the fiber 15 and the diode 21.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A connector assembly for use in a fiber optic transmission system comprising:
   a connector body having in substantially coaxial relationship, a first internal bore for receiving a fiber optic plug, a second internal bore, and means defining an aperture therebetween;
   a faceplate of optically transparent material secured in said second bore with a first surface thereof adjacent to said aperture; and constructed to transmit diverging light beams incident thereto with no additional beam divergence and
   electro-optic converter means fixedly positioned to said connector body adjacent to a second surface of said faceplate and in substantially coaxial relationship with said first and second bores and said aperture.

2. A connector assembly for use in a fiber optic transmission system in accordance with claim 1 wherein said faceplate is secured to said connecting body with a glass-to-metal bond to form a hermetic seal.

3. A connector assembly in accordance with claim 2 wherein said electrooptic converter means is fixedly positioned with respect to said connector body in a manner to provide a hermetic seal.

4. A connector assembly for use in a fiber optic transmission system in accordance with claims 2 or 3 further including a chamber enclosed by walls with electronic circuit means contained therein, said chamber constructed such that all wall bondings form hermetic seals and one of said walls is adapted to receive a section of said connector body terminated with said electrooptic conversion means for insertion into said chamber, said electrooptic conversion means coupled to said electronic circuit means and said connector body secured to said one wall in a manner to provide a hermetic seal, thus forming a hermetically sealed chamber.

5. A connector assembly in accordance with claim 4 further including compliance means positioned in said first bore for maintaining said fiber optic plug, when inserted in said first bore, in a substantially coaxial relationship to said aperture.

6. A method of coupling a fiber optic transmission line with a plug termination to an electro-optic conversion means comprising the steps of:

adapting a first bore in a generally tubular shaped connector body to receive said optical transmission line in a generally coaxial relationship therewith;

providing a second bore in substantially coaxial relationship with said first bore;

providing an aperture between said first and second bores in substantially coaxial relationship therewith such that when said optical transmission line is received by said first bore said plug is placed in close proximity to said aperture and substantially coaxially therewith;

placing a faceplate in said second bore closely adjacent to said aperture for providing transmission of diverging light beams without additional beam divergence;

placing an electro-optic conversion means on a pellet;

positioning said pellet to align said electrophoto conversion means to be substantially coaxial with said aperture;

securing said pellet to said connector body and inserting said plug into said first section of said axial bore of said connector body to provide optical coupling between said fiber optic transmission line and said electro-optic conversion means.

* * * * *